United States Patent [19]

Kato

[11] Patent Number: 4,925,360

[45] Date of Patent: May 15, 1990

[54] INDUSTRIAL ROBOT

[75] Inventor: Hisao Kato, Aichi, Japan

[73] Assignee: Mitsubishi Denki Kabushiki Kaisha, Japan

[21] Appl. No.: 281,398

[22] Filed: Dec. 8, 1988

[30] Foreign Application Priority Data

Dec. 10, 1987 [JP] Japan .................. 62-312519

[51] Int. Cl.⁵ .............................. B25J 19/00
[52] U.S. Cl. ...................... 414/730; 901/49; 901/34
[58] Field of Search ............ 267/136, 182, 137; 414/730; 901/49, 29, 41, 24, 9, 30; 29/407

[56] References Cited

U.S. PATENT DOCUMENTS

| 3,145,333 | 8/1964 | Pardini et al. | 901/34 X |
| 3,168,203 | 2/1965 | Gallistel | 901/34 X |
| 3,824,674 | 7/1974 | Inoyama et al. | 901/34 X |
| 3,906,325 | 9/1975 | Salmon | 901/34 X |
| 3,984,006 | 10/1976 | Takeyasu et al. | 901/34 X |
| 4,178,632 | 12/1979 | Anthony | 901/41 X |
| 4,655,674 | 4/1987 | Kohler et al. | 901/49 X |
| 4,668,157 | 5/1987 | Kato et al. | 901/9 X |
| 4,725,190 | 2/1988 | Kato | 901/49 X |
| 4,738,015 | 4/1988 | Kato | 29/407 |

FOREIGN PATENT DOCUMENTS

| 0042766 | 4/1979 | Japan | 901/34 |
| 61-80307 | 4/1986 | Japan . | |
| 61-134808 | 6/1986 | Japan . | |

Primary Examiner—Douglas C. Butler
Attorney, Agent, or Firm—Leydig, Voit & Mayer

[57] ABSTRACT

In an industrial robot, its hand is mounted on a base plate which is elastically coupled to a base body in such a manner that the base plate is slidable with respect to the base body, and a correcting unit is provided to correct an operational origin of the hand. Accordingly, when the hand is struck against something such as a work stand, the base plate is displaced by the impact so that the hand is prevented from being damaged and the origin of the hand is automatically corrected in accordance with the amount of slide displacement of the base plate detected by a detecting unit.

8 Claims, 4 Drawing Sheets

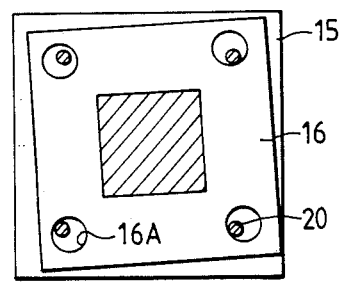
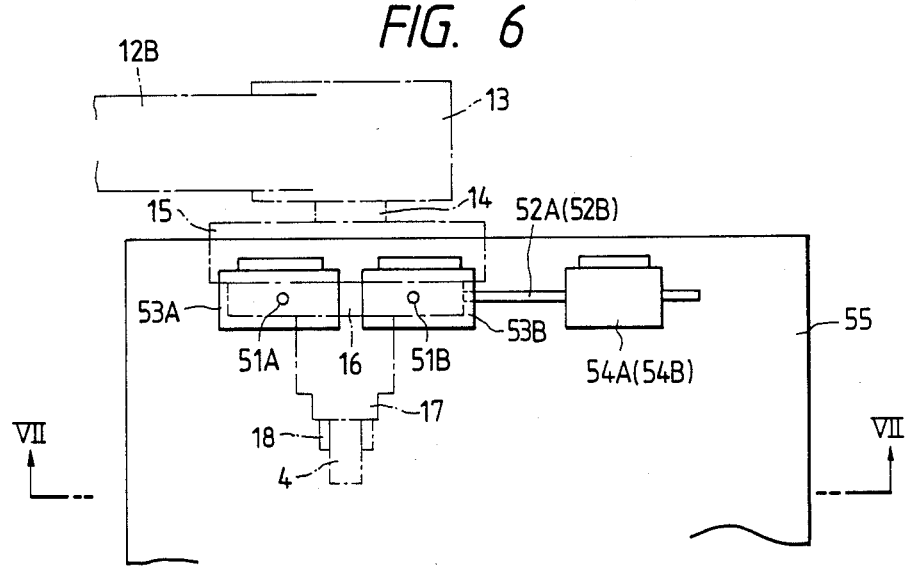

INDUSTRIAL ROBOT

BACKGROUND OF THE INVENTION

This invention relates to industrial robots, and more particularly to the position correction of the hand of an industrial robot.

A number of industrial robots carrying out a series of operations according to a program have been conventionally proposed. For instance, an industrial robot which handles workpieces being moved on the conveyor has been disclosed by Japanese Patent Application Publication No. 21362/1980. In addition, Japanese Patent Application Laid Open No. 80307/1986 has disclosed an industrial robot in which, when it is detected that its hand is out of the predetermined operating area, the operation of the robot is stopped. That is, the conventional industrial robots operate within a predetermined work range according to the program, or the work points of the hand are taught to suitably operate so that the hand operates accurately, which are well known in the art.

In most of the conventional industrial robots, the hands are connected to the arms with bolts. Therefore, if the bolts are loosened, then the hand is displaced, as a result of which the hand may not be able to operate accurately. In addition, in this case, it is necessary to return to the hand to its original position and to teach the locus to the hand again. Sometimes, the hand may be damaged when striking against the work stand.

SUMMARY OF THE INVENTION

In view of the foregoing, an object of the invention is to provide an industrial robot in which,. the displacement of the hand is automatically corrected, and it is prevented from being damaged when struck against something like a work stand.

The foregoing object and other objects of the invention have been achieved by the provision of an industrial robot in which a hand is mounted to a base body through a base plate which is elastically coupled to the base body in such a manner that the base plate is slidable with respect to the base body; and correcting means is provided to correct the operation origin of the hand based on an amount of slide displacement of the base plate, detected by detector means, with respect to an initial reference point.

According to the present invention, if the hand is struck against the work stand, the base plate slides with respect to the base body to absorb or release the impact, thereby to prevent the hand from being damaged. At the same time, the amount of slide displacement is detected by the detector means, so that the original position of the hand is automatically corrected.

The nature, principle and utility of the invention will become more apparent from the following detailed description when read in conjunction with the accompanying drawings, in which like parts are designated by like reference numerals or characters.

BRIEF DESCRIPTION OF THE DRAWINGS

In the accompanying drawings:

FIG. 5 is a diagram, corresponding to FIG. 3, showing a state of the base plate of the industrial robot's hand when the workpiece is struck against the workpiece receiving stand;

FIG. 6 is a side view showing a detecting unit;

DETAILED DESCRIPTION OF THE INVENTION

One preferred embodiment of this invention will be described with reference to the accompanying drawings.

Figure 1:
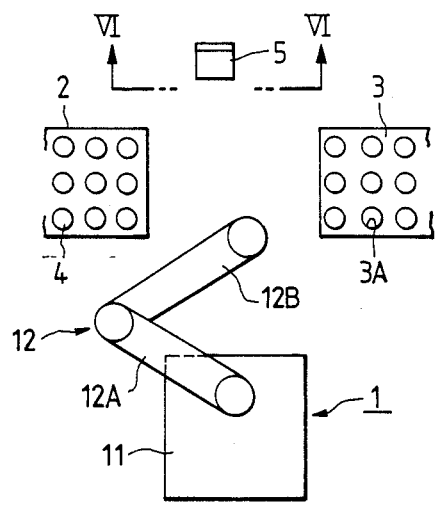
FIG. 1 is a plan view showing a part of a manufacturing line to which one example of an industrial robot according to this invention is applied.
Figure 2:
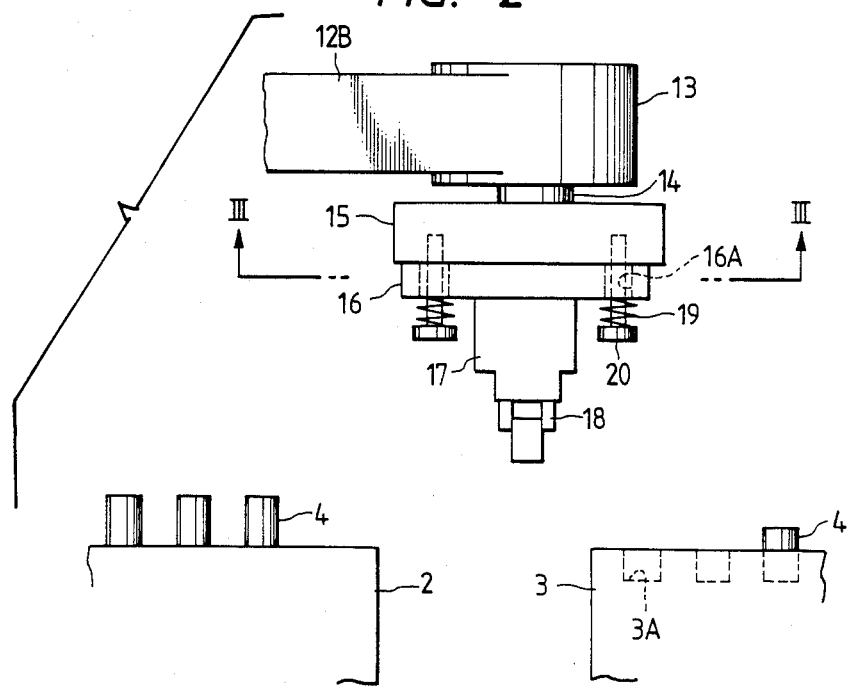
FIG. 2 is an enlarged side view showing components of the industrial robot according to the invention.

As shown in FIG. 1, an industrial robot 1 according to this invention is positioned beside a workpiece placing stand 2 and a workpiece receiving stand 3, and it is so designed as to move a workpiece 4 from the workpiece placing stand 2 to a recess 3A formed in the workpiece receiving stand 3 by using its arm assembly 12. The arm assembly 12 comprising a first arm 12A and a second arm 12B is so designed as to stretch to and retract from the stands 2 and 3. As shown in FIG. 2, a drive unit 13 is provided at the end of the second arm 12B, so as to rotatably support a base body 15 through a shaft 14. A hand 17 is mounted through a base plate 16 to the lower surface of the base body 15, in such a manner that it is rotated through the base body 15 and the base plate 16 by the drive unit 13. The hand has holding pawls 18 to pick up a workpiece 4 from the workpiece placing stand 2 and to move it to the workpiece receiving stand 3 and insert it into a recess 3A.

Figure 3:
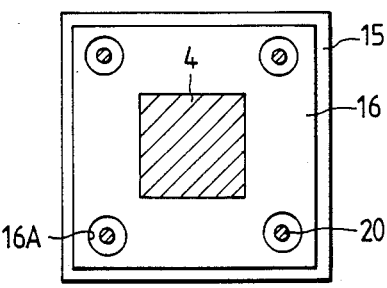
FIG. 3 is a sectional view taken along line III—III in FIG. 2.
Figure 4:
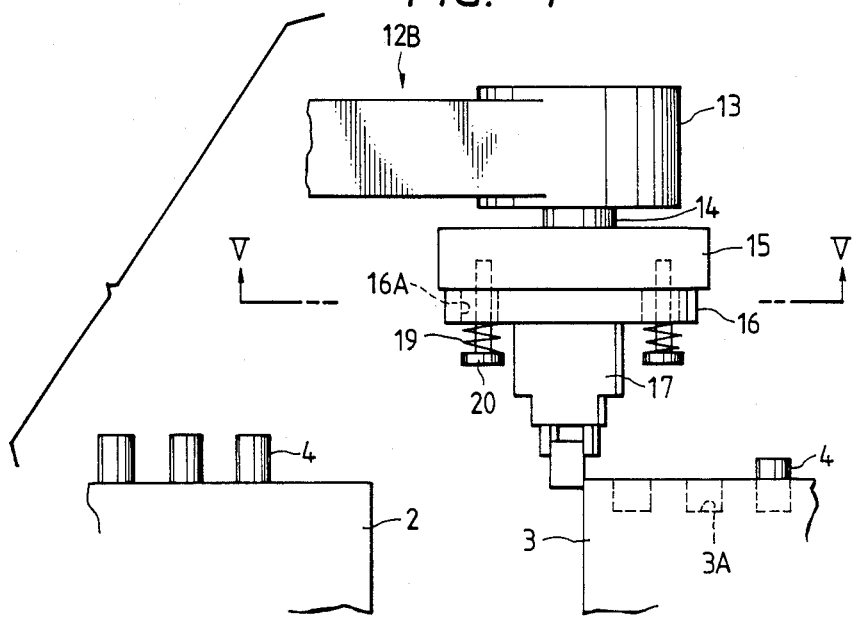
FIG. 4 is a side view, corresponding to FIG. 2, showing the workpiece struck against the workpiece receiving stand.

The relation between the base plate 16 and the base body 15 will be described with reference to FIGS. 2 through 5 in more detail. The base plate 16 and the base body 15 may be rectangular, and the former 16 is slightly smaller than the lower surface of the base body 15. Holes 16A are formed in the corner portions of the base plate 16, respectively, as shown in FIGS. 2 and 3. The base plate 16 is elastically abutted against the base body 15 with long bolts 20 inserted into the holes 16A through coiled springs 19. That is, when the long bolts 20 are screwed tight into the base body 15, the springs 20 are compressed so that the base plate is elastically abutted against the base body, and that the base plate and the base body are not shifted from each other. The diameter of the holes 16A is larger than that of the long bolts 20 so that the base plate may slide with respect to the base body 15. Therefore, when, in moving a workpiece 4 over to the workpiece receiving stand 3 with the holding pawls 18, the workpiece 4 collides against the stand 3 as shown in FIG. 4, the base plate 16 is slid by the impact, as a result of which, as shown in FIG. 5, the reference point of the hand 17 is somewhat displaced from the original (initial) position, while the impact is absorbed or released. Thus, the hand 17 is prevented from being damaged.

Figure 7:
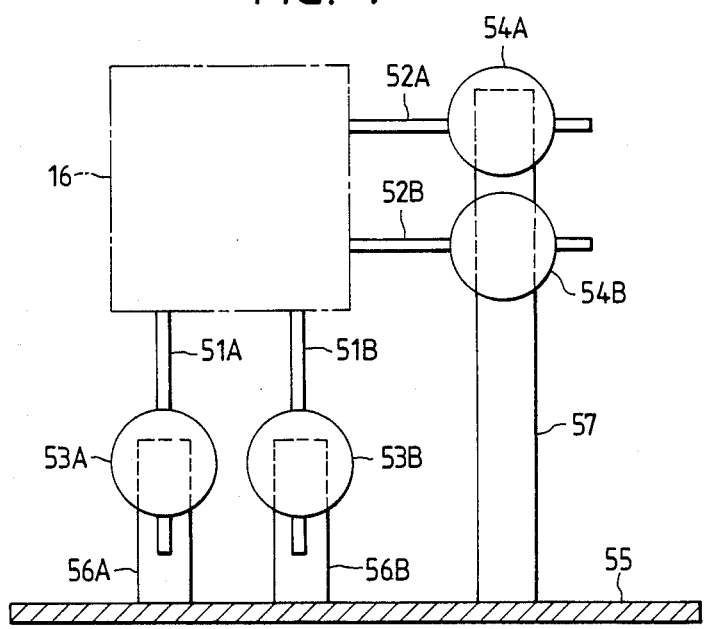
FIG. 7 is a sectional view taken along line VII—VII in FIG. 6.

As shown in FIG. 1, a detecting unit 5 for detecting the coordinate position of the base plate 16 is disposed beside the workpiece placing stand 2 and the workpiece receiving stand 3, confronting the industrial robot 1. The detecting unit 5 is shown in FIGS. 6 and 7 in more detail. The detecting unit 5 comprises detecting elements 51A and 51B which are in contact with one side of the base plate 16 and detecting elements 52A and 52B which are in contact with another side of the base plate 16. These detecting elements detect two X-coordinates and two Y-coordinates of the base plate 16. The outputs of those detecting elements 51A, 51B, 52A and 52B are applied to dial gage type detectors 53A, 53B, 54A and 54B, respectively, for the results of detection. The detecting element 51A and the detector 53A, and the detecting element 51B and the detector 53B are mounted on supports 56A and 56B, respectively, which are extended horizontally from a supporting board 55, and the detecting elements 51A and 51B are in contact with one side of the base plate 16 on the prolongation lines of the supports 56A and 56B. The remaining detecting elements 52A and 52B and detectors 54A and 54B are mounted on a support 57 which is extended from the supporting board 55 in parallel with the supports 56A and 56B, and the detecting elements 52A and 52B are in contact with another side of the base plate 16 in such a manner that they are perpendicular to the supports 56A and 56B. The detecting elements 51A, 51B, 52A and 52B are so spaced from one another as predetermined. When the base plate 16 is displaced as shown in FIG. 5, the detecting elements extend or retract according to the amount of displacement, and the amounts of extension and retraction are detected by the dial gage type detectors 53A, 53B, 54A and 54B. For instance, the X-coordinates and Ycoordinates in FIG. 3 detected through the detectors 53A, 53B, 54A and 54B by the detecting elements 51A, 51B, 52A and 52B are determined $X_{11}$, $X_{21}$, $Y_{11}$ and $Y_{21}$, and the corresponding coordinates in FIG. 5, in which the base plate 16 has been displaced, are determined as $X_{12}$, $X_{22}$, $Y_{12}$ and $Y_{22}$, respectively.

Figure 8:
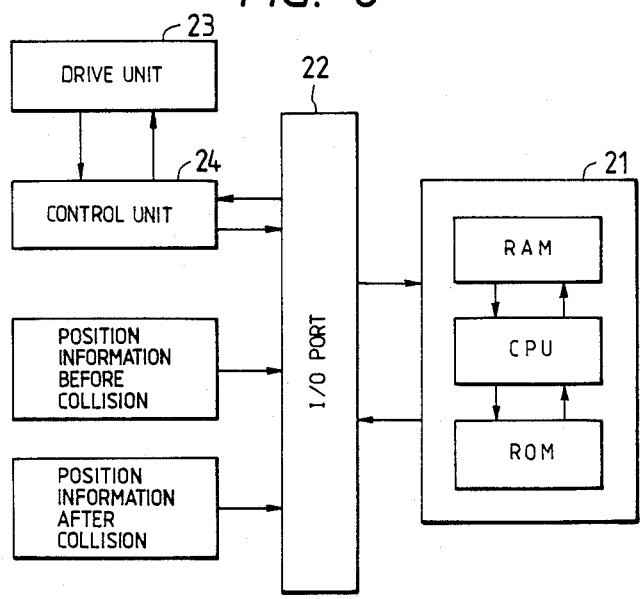
FIG. 8 is a block diagram showing the arrangement of an industrial robot according to the invention.

The industrial robot 1, as shown in FIG. 8, has a computer 21. The computer 21 is connected through I/O port 22 to a drive unit 23 and a control unit 24, so that various devices are controlled according to the program in the computer 21. The computer 21 has correcting means. The correcting means reads the X-coordinates and Y-coordinates as position data through the I/O port 22, which are detected by the detecting elements 51A and 51B and the detecting elements 52A and 52B, and corrects those coordinates in software to the original values according to the amount of displacement of the base plate, thereby to return the reference point of the hand 17 to the original (initial) position. When the coordinates are corrected in this manner, the teach points are also automatically corrected.

The operation of the industrial robot 1 thus organized will be described.

If, in moving a workpiece 4 from the work placing stand 2 to the work receiving stand 3 with the hand 17 according to the computer program, the workpiece 4 is struck against the work receiving stand 3 as shown in FIG. 4, the hand 17 together with the base plate 16 is displaced by the impact. In this case, the hand 17 is moved to the detector 5 and the two sides of the base plate 16 are made to contact with the detecting elements 51A, 51B, 52A and 52B as shown in FIG. 7. As a result, the detecting elements 51A, 51B, 52A and 52B indicate $X_{12}$, $X_{22}$, $Y_{12}$ and $Y_{22}$, which are different from $X_{11}$, $X_{21}$, $Y_{11}$ and $Y_{21}$ (initial reference point), respectively. Then, the correcting means is activated to restore the coordinates and to correct the teach points of the hand 17 as much as the amount of correction. Thus, the industrial robot accurately carries out the work as required.

The hand 17 of the industrial robot 1 may be struck against the workpiece stand. However, the impact is absorbed or released by the sliding of the base plate 16, and therefore the hand 17 is prevented from being damaged. Moreover, the displacement of the hand 17 is automatically corrected, and the hand 17 accurately carries out the given work. Accordingly, it is unnecessary to teach the hand again after it is displaced.

As was described above, when impact acts on the hand of the industrial robot, it is absorbed or released by the sliding of the base plate so that the hand is prevented from damage, and the displacement of the hand caused by the impact is automatically corrected so that the hand can continuously carry out the given work.

What is claimed is:

1. An industrial robot having a hand operated through a point locus, said industrial robot comprising:
   an arm;
   a base body connected to said arm;
   a base plate, the hand being mounted on said base plate;
   a planarly displaceable coupling between said base plate and said base body, said planarly displaceable coupling connecting said base plate to said base body and substantially restricting sliding displacement of said base plate relative to said base body to movement within a plane;
   detector means for detecting the coordinates of a position of said base plate and for obtaining an amount of slide displacement of the position of said base plate with respect to an initial reference position; and
   correcting means for correcting the locus points by the amount of slide displacement.

2. An industrial robot as claimed in claim 1 in which said base plate has holes formed therethrough, and in which said planarly displaceable coupling comprises bolts and springs, each of said bolts being inserted through one of said springs, through a hole in said base plate, said bolts being smaller in cross section than the holes.

3. An industrial robot as claimed in claim 2 in which said planarly displaceable coupling abuts said base plate against said base body.

4. An industrial robot having a hand, said robot comprising:
   an arm;
   a base body connected to said arm;
   a base plate, the hand being mounted on said base plate; and
   planarly displaceable coupling means for connecting said base plate to said base body substantially at a fixed distance while confining displacement of said base plate relative to said base body to movement within a plane.

5. An industrial robot as claimed in claim 4 in which said base plate has holes formed therethrough and in which said planarly displaceable coupling means comprises a spring and a bolt smaller in cross section than the holes, said bolt being inserted through the spring and a hole in said base plate and secured to the base body.

6. An industrial robot as claimed in claim 5 in which said planarly displaceable coupling means abuts said base plate against said base body.

7. An industrial robot as claimed in claim 6 in which said base plate and said base body each comprises a flat surface, said respective flat surfaces of said base plate and said base body abutting along a common plane, and the base plate and base body being relatively displaceable in the plane.

8. An industrial robot as claimed in claim 4 in which the hand is operated through a point locus, said robot further comprising:
 detector means for detecting the coordinates of a position of said base plate and for calculating an amount of planar displacement of the position of said base plate with respect to an initial reference position; and
 correcting means for correcting the locus points by the amount of planar displacement.

* * * * *